3,530,276
AUTOMATIC COFFEE BREWING CONTROL
Daniel M. Wells, Torrance, Calif., assignor to Farmer Bros. Co., Torrance, Calif., a corporation of California
Filed May 20, 1968, Ser. No. 730,224
Int. Cl. F24h 1/00
U.S. Cl. 219—334                    7 Claims

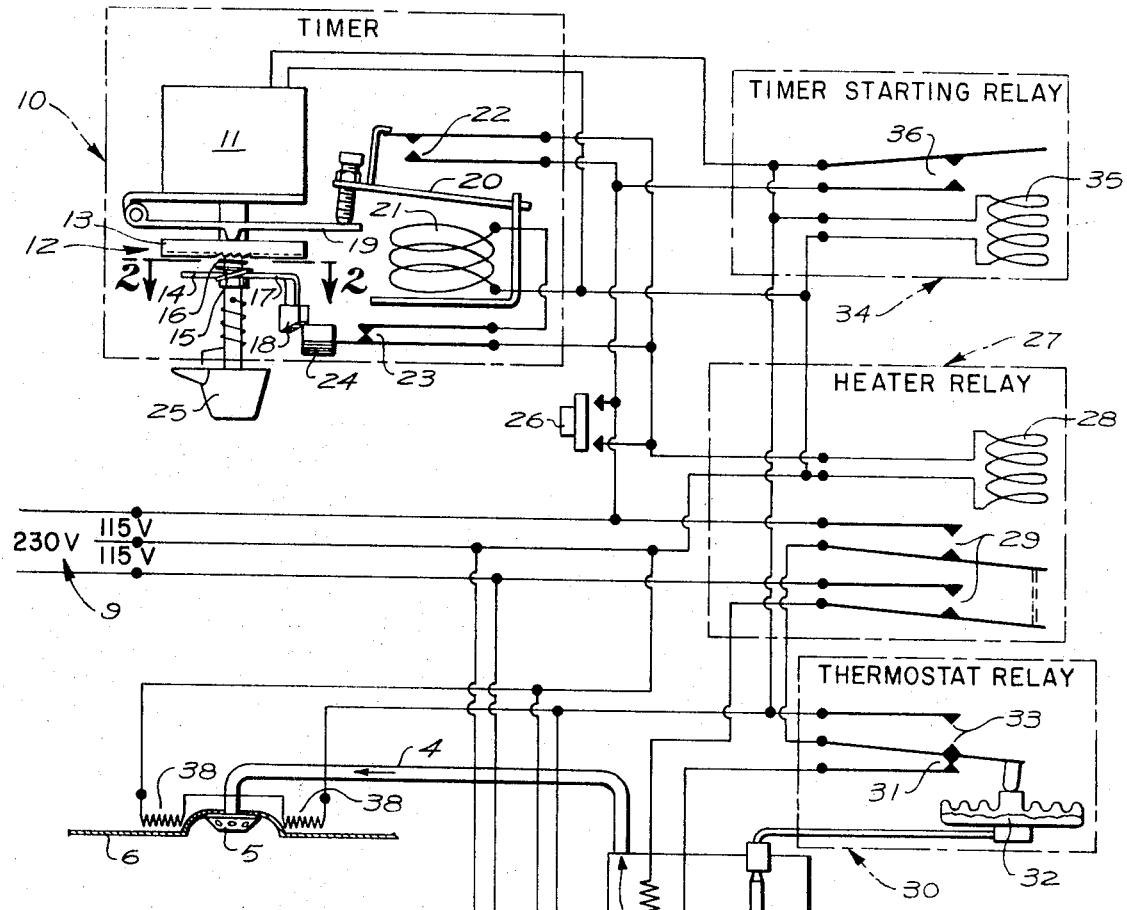
FIG. 1
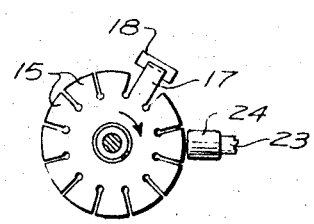
FIG. 2
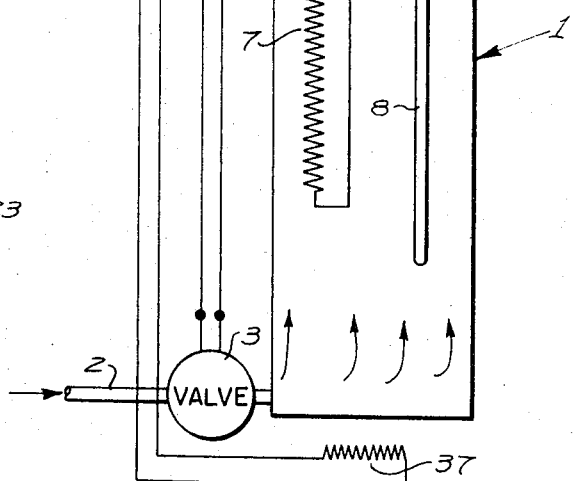
INVENTOR.
DANIEL M. WELLS
BY
ATTORNEYS

United States Patent Office 3,530,276
Patented Sept. 22, 1970

ABSTRACT OF THE DISCLOSURE

A control for brewing coffee automatically, in which a momentary manually actuated starter switch initiates operation of a main heater located in a water storage tank controlled by an emersion thermostat, and a holding switch maintains the operation of the heater subject to the thermostat until a predetermined brewing temperature is reached, whereupon the thermostat closes circuits which open a water supply valve to the storage tank to admit cold water, thereby to discharge the previously heated water through a spray head onto a charge of coffee, and simultaneously to initiate operation of a timer which shuts off the supply valve after a predetermined time so that a predetermined volume of hot water is supplied to the coffee. More particularly, during the brewing period determined by the timer, the thermostat may energize and de-energize the main heater to maintain the water at maximum temperature without affecting the timing of the brewing period. Finally on completion of the brewing period, the entire control system is shut off and reset for subsequent repeat of the entire cycle when the starter switch is again momentarily closed.

BACKGROUND AND SUMMARY OF THE INVENTION

Various methods of brewing coffee have been attempted; of these, the method which involves the application of a hot water spray onto a charge of coffee contained loosely in a filter cone or in a prepackaged filter cell has resulted in the more perfect brew. Such a method requires that the hot water supplied to the spray head be as hot as possible, yet below the boiling point of water. A generally accepted approach has involved the use of a water storage tank with a heater to bring the water to near but below its boiling temperature and drive the heated water from the tank by introducing fresh cold water. Admixture of the hot and cold water is minimized by providing a tank of minimum diameter; however, some admixtures does occur so that the temperature of at least some of the brewing water is adversely affected.

The present invention provides means whereby the storage tank continues to be heated as needed while controlled by the thermostat without altering the duration of a previously selected brewing cycle; yet, when the period is completed, all components are reset so that the brewing period and its preceding heating period may be repeated and perform the complete operating cycle.

A further feature of the present invention is a standby means for maintaining the water in the storage tank at a preselected temperature to reduce the time required to heat the water to a selected brewing temperature.

Another feature is the provision of means controlled by the brewing timer which heats the region surrounding the spray head to prevent water condensation.

DESCRIPTION OF THE FIGURES

FIG. 1 is a partial mechanical, partial electrical, diagrammatical view, showing the automatic coffee brewing control and portions of the coffee brewing apparatus.

FIG. 2 is a fragmentary, sectional view, taken through 2—2 of FIG. 1.

The coffee brewing apparatus for which the automatic brewing control is adapted includes a storage tank 1, connected to an inlet line 2, controlled by a solenoid valve 3. An outlet line 4 leads to a downwardly directed spray head 5, underlying a plate 6. The storage tank is provided with a heater element 7 and a thermostat probe 8.

Inasmuch as it is desired to heat water in the storage tank as quickly as possible, it is preferred to utilize a power line 9, which provides a standard 230 volts capable of division into 115 volts circuits which are employed to supply current to the relays.

The automatic coffee brewing control includes a timer 10, having a motor 11, which is connected to a clutch 12. The clutch includes a radially serrated drive disk 13 and a driven disk 14, having radial ratchet fingers 15. The two disks are normally separated by a spring 16. In place of one of the fingers, there is provided an extended finger 17, terminating in a cam 18.

Extending across the drive disk 13 is a clutch closing lever 19, the extremity of which is depressed by a movable pole piece 20 when attracted by a solenoid 21. The solenoid, when energized, closes a pair of holding contacts 22. Disposed radially of the clutch 12 is a pair of cycle terminating contacts 23, provided with a cam 24, which is engaged by the cam 18 after the disk 14 has been turned to a predetermined arc. The extent of movement is adjusted by frictionally turning the driven disk 14 with respect to the drive disk 13 by means of a suitable pointer knob 25. The mechanism comprising the timer 10 may, per se, be considered as conventional; however, the timer is related to the other elements of the brewing control in a novel manner. It should be noted that the cycle terminating contacts 23 are of the snap action type and are normally closed.

A starter switch 26 is in series with the cycle terminating contacts 23 and in parallel with the holding contacts 22. The starter switch is normally open and is manually closed momentarily to energize the solenoid and close the contacts 22. Closing the contacts 22 initiates operation of a heater relay 27, through its solenoid 28. The heater relay includes a series pair of heater contacts 29, connected to the 230 volt circuit and to the heater element 7. A thermostat relay 30 includes a pair of contacts 31 which are normally closed and in series with the heater contacts 29. The contacts 31 are opened by a fluid pressure diaphragm 32, functionally connected to the thermostat probe 8. The thermostat relay includes a second pair of contacts 33, which are normally open, but are closed when the contacts 31 are opened.

The contacts 33 initiate operation of a timer starting relay 34, having a solenoid 35, and a pair of contacts 36. The timer starting relay 34 includes a holding circuit for the solenoid 35 so that the contacts 36 are maintained closed once the solenoid is energized. The contacts 36 complete a circuit through the timer motor 11 and also complete a circuit through the solenoid valve 3 which supplies water to the storage tank 1.

Operation of the automatic coffee brewing control is as follows:

Initially, the pointer knob is set so that the timer motor will operate through a predetermined interval and the valve 3 will be open for an identical interval. This interval is calculated to permit the introduction of sufficient water into the tank, displacing the hot water therein through the spray head 5 into a conventional brewing vessel, and from the vessel into a decanter, not shown. When the maximum interval is selected, a full decanter of brewed coffee is produced. If a lesser interval is selected, a correspondingly smaller brew of coffee is produced.

After placing the appropriate amount of coffee in the coffee brewing vessel, the operator presses the starter switch 26, which energizes the solenoid 21 and closes the holding contacts 22. The timer motor 11 is not started at this time. Instead, a circuit is completed through the heater relay 27 and thermostat relay 30, which circuit remains closed until the water in the storage tank reaches brewing temperature, as close to the boiling point of water as possible, preferably in the range of 205°.

When brewing temperature is reached, the normally closed contacts 31 are opened so that the circuit through the heater element 7 is open. At the same time, the contacts 33 close, energizing the solenoid 35, closing the contacts 36 of the timer starting relay. These contacts are held closed by the solenoid 35, causing the timer motor 11 to commence operation and also opening the solenoid vlave 3, so that fresh water which is cold may flow into the storage tank 1, displacing the hot water upwardly, so that it discharges from the spray head 5.

It is desirable, of course, that the amount of water heated during each brewing cycle be as small as possible so as to reduce the heating period which precedes the brewing period, thereby reducing the duration of the entire brewing cycle. Thus, the storage tank is made as small as possible. Also, to minimize mixture of the cold water with the hot water, that is, to maintain as nearly as possible a definite interface between the hot and the cold water, the storage tank is made relatively small in diameter. However, at best, the ideal conditions are only approximated, and some cold water may mix with the hot water, particularly toward the end of the brewing period.

It will be noted that once the thermostat relay 30 has closed the contacts 33, closing the relay 34, that the contacts 33 may reopen without affecting the timer motor 11 or the solenoid valve 3. As a result, the incoming cold water, as sensed by the probe 8, causes the contacts 31 to close, energizing the heater element 7. This is particularly effective of any admixture of the hot and cold water, as the temperature has not been lowered much below the desired temperature. As a result, all of the water discharging from the spray head is maintained at the desired brewing temperature.

When the brewing period has been completed, the cams 18 and 24 engage, opening the contacts 23, which breaks the circuit through the solenoid 21, and opens the holding contacts 22. When the circuit through these contacts is open, the relays 27 and 34 are de-energized and the brewing control is ready to repeat its operation.

In order to reduce the time required to heat the water in the storage tank, a warmer element 37 is provided, which remains on continuously. The resistance of the warmer element 37 is such that an equilibrium is established when the water temperature reaches approximately 165° to 170° F.

There is a tendency for moisture to condense on the plate 6 surrounding the spray head 5. This condition is prevented by a small dryer element 38, placed above the plate 6, and connected in parallel with the solenoid valve 3.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. An automatic coffee brewing control for brewing apparatus including a water storage tank, a heating element in said tank, a spray head communicating with the upper end of the tank for spraying hot water on a charge of coffee, an inlet for supplying cold water to said storage tank for displacement of hot water to said spray head, and a temperature sensor exposed to the water in said tank, said coffee brewing control comprising:
    (a) manually initiated relay means for energizing said heating element;
    (b) a thermostat relay operable by said temperature sensor for de-energizing said heating element when the water in said storage tank reaches brewing temperature and intermittently operable thereafter to maintain said brewing temperature;
    (c) an adjustable timer;
    (d) a solenoid valve in said water inlet;
    (e) holding relay means initiated by said thermostat relay for actuating said timer and opening said water inlet valve for a period determined by said timer, irrespective of intermittent operation of said thermostat relay during flow of cold water into said storage tank;
    (f) and a terminating switch operable on completion of the period determined by said timer to stop said timer and open the electrical circuits connecting said relays.

2. A coffee brewing control, as defined in claim 1, wherein:
    (a) said thermostat relay includes normally closed contacts effecting completion of a circuit through said heating element and normally open contacts for initiating operation of said holding relay.

3. A coffee brewing control, as defined in claim 1, wherein:
    (a) said timer includes a timing arm movable to engage said terminating switch and a clutch for turning said timing arm;
    (b) said manually initiated relay means includes a first relay having mechanical means for engaging said clutch, a pair of holding contracts, and a solenoid for operating said mechanical means and closing said holding contacts, a manually engaged starter switch for said first relay, and a second relay having a solenoid operated by said holding contacts and contacts closed to complete a circuit through said heater element.

4. An automatic coffee brewing control for brewing apparatus including a water storage tank, a heating element in said tank, a spray head communicating with the upper end of the tank for spraying hot water on a charge of coffee, an inlet for supplying cold water to said storage tank for displacement of hot water to said spray head, and a temperature sensor exposed to the water in said tank, said coffee brewing control comprising:
    (a) a manually operated starter switch;
    (b) a first holding relay closed thereby;
    (c) a heater relay closed by holding relay to complete a circuit through said heater element;
    (d) a self-resetting timer;
    (e) a solenoid valve in said water inlet;
    (f) a second holding relay operable, when closed, to activate said timer and open said valve;
    (g) a thermostat relay having normally closed contacts in series with said heater relay, normally open contacts for closing said second holding relay and a means responsive to said temperature sensor operates said contacts thereby to de-energize said heater element and close said second holding relay; said thermostat relay being operable to re-energize said heater element during operation of said timer in response to rise of cold water in said tank as the hot water is depleted therefrom;

(h) and a termination switch operated by said timer to stop said timer for reset, close said valve and open said heater and holding relays.

5. A coffee brewing control, as defined in claim 4, wherein:

(a) said timer includes a timing arm movable to engage said terminating switch, a clutch for turning said timing arm, and mechanical means operated by said first holding relay for engaging said clutch thereby to turn said arm when said timer is activated.

6. A coffee brewing control, as defined in claim 4, which further comprises:

(a) a standby heater for said storage tank to maintain the water temperature therein above a predetermined minimum value.

7. A coffee brewing control, as defined in claim 4, which further comprises:

(a) an anti-condensation heater surrounding said spray head, said heater being parallel connected with said valve to operate during discharge of water from said spray head.

References Cited

UNITED STATES PATENTS 3,396,653    8/1968    Rutherford et al. _____ 99—282

FOREIGN PATENTS 932,979    7/1963    Great Britain.

ANTHONY BARTIS, Primary Examiner

C. L. ALBRITTON, Assistant Examiner

U.S. Cl. X.R.

99—282; 219—321, 331, 441, 519